United States Patent [19]

Speranza et al.

[11] Patent Number: 5,264,132
[45] Date of Patent: Nov. 23, 1993

[54] METHOD OF REMOVING ALKALINE MATERIALS FROM WASTE WATER

[75] Inventors: George P. Speranza; Edward T. Marquis, both of Austin, Tex.

[73] Assignee: Texaco Chemical Company, White Plains, N.Y.

[21] Appl. No.: 891,068

[22] Filed: Jun. 1, 1992

[51] Int. Cl.$^5$ .......................... B01D 15/04; C02F 1/28
[52] U.S. Cl. .................................... 210/670; 210/683; 210/687; 210/691; 210/692; 210/925
[58] Field of Search .............. 210/687, 691, 692, 683, 210/670, 925

[56] References Cited

U.S. PATENT DOCUMENTS

| | | | |
|---|---|---|---|
| 4,230,807 | 10/1980 | Evans | 210/673 |
| 4,336,140 | 6/1982 | Smith et al. | 210/685 |
| 4,385,121 | 5/1983 | Knowlton | 210/611 |
| 4,539,761 | 9/1985 | Habermehl | 210/925 |
| 4,693,828 | 9/1987 | Yoshioka et al. | 210/683 |
| 5,061,372 | 10/1991 | Rak | 201/673 |

Primary Examiner—Stanley S. Silverman
Assistant Examiner—Cynthia L. Nessler
Attorney, Agent, or Firm—Jack H. Park; Kenneth R. Priem; Cynthia L. Kendrick

[57] ABSTRACT

Disclosed is a method for removing ammonia, organic amines and alkaline impurities from waste water which comprises using a partially spent ion exchange resin which no longer meets the purity requirements for the production of MTBE, washing the catalyst with water, contacting it with waste water for a an adequate period and removing the purified filtrate.

12 Claims, 1 Drawing Sheet

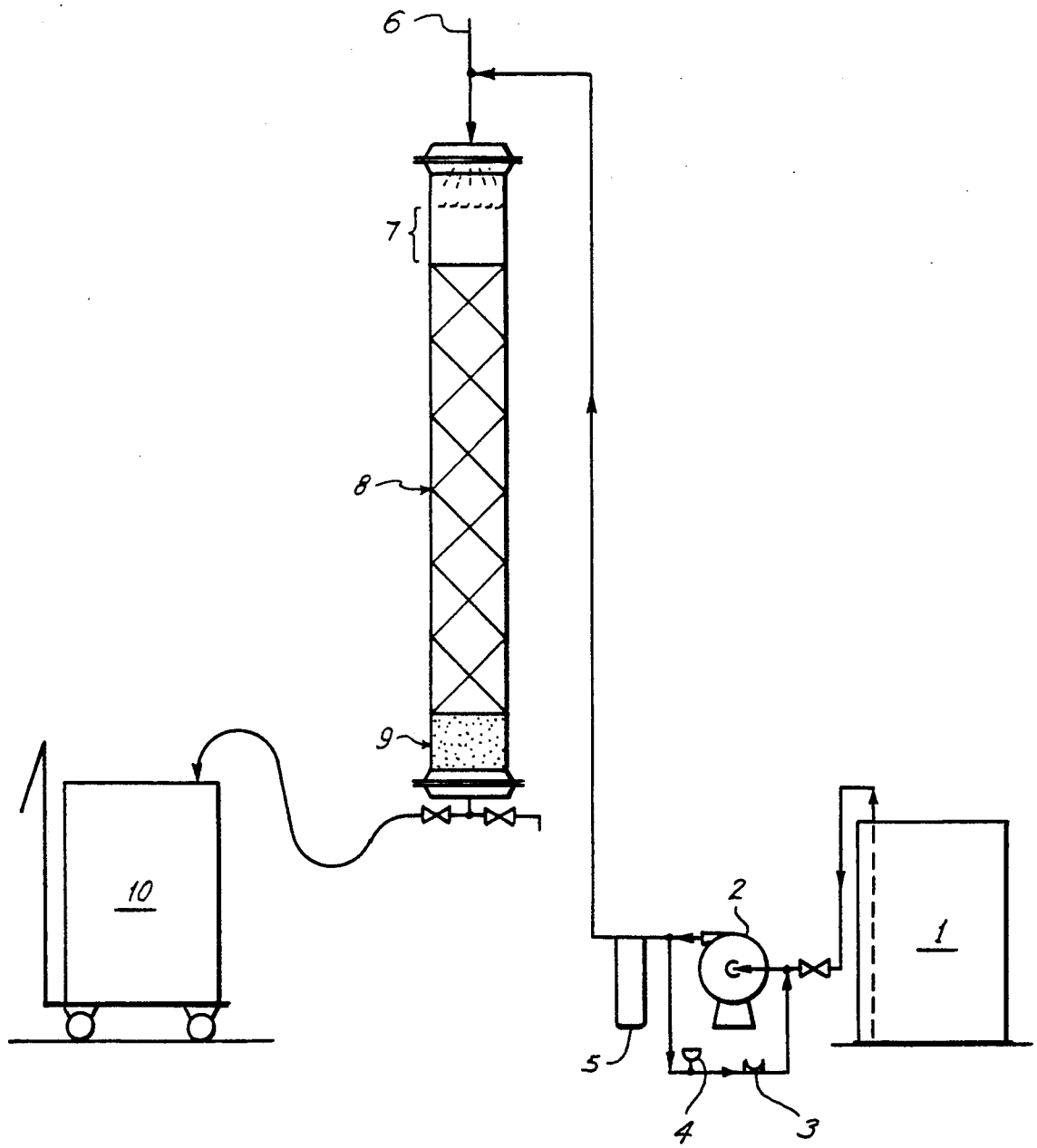

METHOD OF REMOVING ALKALINE MATERIALS FROM WASTE WATER

BACKGROUND OF THE INVENTION

1. Field of the Invention

This invention relates to a method for removing waste materials from water. More particularly, this invention relates to a new use for spent ion exchange resins such as, for example, the type used in MTBE production, to remove alkaline materials from contaminated water. This method is not only inexpensive and efficient, but also reduces problems inherent in disposal of the partially depleted catalyst and would reduce the impact on the environment of contaminants and old catalysts.

2. Description of Related Art

The use of ion exchange resins for removal of magnesium and noncarbonate minerals from water is known in the field of water treatment or water softening. The cost and frequency of regeneration are principal disadvantages. The ion-exchange materials generally used in softening water are styrene-divinyl benzene copolymers. *Kirk-Othmer Encyclopedia of Chemical Technology*, 8, 70 and 24, 425 (1982).

It is known in the art that morpholine may be removed from aqueous solutions with ion exchange resins. Such a method is described in Khim Prom (Moscow) 1983, pp. 83–83. The disadvantage is the high cost of the resin. A variation on the Russian technique is described in U.S. Pat. No. 5,043,075 where the cation exchange resin contains carboxyl groups instead of the conventional sulfonic acid groups.

Morpholine is an industrially useful amine because of its qualities as a corrosion inhibitor in boiler water. It is used in the preparation of many chemicals, drugs and pesticides and consequently, it can be found in many industrial effluents. Studies on the biodegradability of morpholine are summarized in a paper by J. S. Knapp et al., Journal of Applied Bacteriology, 1982, 52, 5–13. It was found that under controlled conditions morpholine is completely biodegradable.

One of the most critical areas of study in industrial chemical processes is that of devising methods to remove impurities from waste water at low cost, and another is searching for ways to avoid having to dispose of chemical compositions such as catalysts which are still partially active. Plants producing or using basic materials such as ammonia, organic amines, alkali salts or caustic have waste streams that often need to be neutralized.

Waste water streams pose a problem for disposal because many of the amines and metals are toxic. In dilute solutions, distillations and extraction methods are prohibitively expensive. A method often used for ridding waste water of amine products is burning the amine streams. Actually, this method is fairly expensive as well. The cost can run as high as $2.00/gallon.

Another aspect of the background for this invention is that the current transition to unleaded fuels in the United States has caused a demand for the addition of oxygenates into gasoline which has lead to the development of methyl-tert-butylether (MTBE) as a gasoline additive. MTBE and other chemicals such as ethyl-tert-butylether (ETBE) and tert-amyl methylether (TAME) are made by the addition of alcohol to an olefin catalyzed by a sulfonic acid ion exchange resin. The demand for MTBE has caused it to be the fastest growing chemical of the 80's and the demand will grow rapidly in the 90's. Chemical Business, January 1992, p. 24.

The consumption of MTBE is currently about 180,000 barrels per day and could be as high as 670,000 barrels per day by the year 2000. Ibid, p. 25. Another reference indicates the demand would reach 1.2 million barrels per day by the year 2000. (Chemical Week, Nov. 20, 1991, p. 36.)

Due to the demand for high productivity in the production of MTBE the ion exchange catalyst is used until reduced activity makes it more reasonable to exchange it for a fresh catalyst. This corresponds to a point of about 70–80% of its original activity. This means there are enormous amounts of used catalyst that must be disposed of. Disposal of this partially spent catalyst gives rise to environmental concerns and often requires some type of permit. It would be extremely efficient from a commercial and environmental viewpoint to accomplish a desirable goal using this partially spent catalyst and, at the same time, reduce the remaining activity of the resin so that disposal of it is not as objectionable.

It would be a distinct advance in the art if an inexpensive means were available for removing alkaline impurities from waste water. It would be extremely efficient and advantageous if this could be accomplished with a substance which to this point has had to be discarded due to the productivity requirements in the MTBE, ETBE or TAME synthesis reaction. To remove impurities from waste water in one process with a partially spent catalyst that normally entails disposal problems would be quite efficient in every respect.

SUMMARY OF THE INVENTION

It is the purpose of this invention to utilize a very important development in industrial chemistry which makes it practical to improve the quality of contaminated water at a very low cost.

In accordance with the foregoing the instant invention describes a method to utilize a partially spent MTBE ion-exchange resin to remove alkaline impurities such as ammonia and organic amines from waste water, thus providing waste water which meets higher environmental standards and, at the same time, more completely depletes the remaining activity of the ion-exchange resin so that final disposal of it is not as objectionable from an environmental view.

In a specific example a (70%) spent ion exchange resin from the production of MTBE is washed with water and used to remove all morpholine from the contaminated water until the resin is exhausted.

BRIEF DESCRIPTION OF THE DRAWINGS

FIG. 1 represents a column which could be employed for contacting or reacting alkaline waste water with the spent ion exchange resin catalyst.

DESCRIPTION OF THE PREFERRED EMBODIMENT

In the process of this invention up to at least about 98% of the alkaline impurities, including morpholine, are removed from waste water using a partially spent ion-exchange resin used in the production of MTBE which would normally require disposal in a procedure which often requires a permit. In the case of Example 7, 100% of the morpholine is removed from the waste water.

The feedstock comprises waste water containing alkaline impurities. This waste water may contain not only morpholine, but other organic amines, ammonia and alkaline metallic compounds.

The catalyst is an ion-exchange resin of the type used in the production of methyl tertiary butyl ether, ethyl tertiary butyl ether and tertiary amyl methyl ether. Catalysts of this type are generally characterized by insoluble cross-linked polymers and often contain sulfonic acid groups. Examples include Dowex 50W, Dowex Misc-1, Amberlyst®15 and Amberlite®120.

Amberlyst® 15 is the trademark for an acidic ion exchange resin produced by Rohm & Haas characterized by insoluble cross-linked polymers. Amberlite® 120 is the trademark for an acidic ion exchange resin also produced by Rohm & Haas. As mentioned, due to the demand for high productivity, the ion exchange resin still has about 70-80% of its original activity at the point at which it is taken out of service. The "used MTBE resins" described herein are almost as effective for purifying water as unused resins purchased new, which are also considerably more expensive. In fact, the used resin is about 80% as effective as new ion exchange resin.

FIG. 1 represents a scheme which could be employed for reacting the spent catalyst with alkaline waste water in a column. The waste water is collected in a tank represented by 1. The pump, 2, would cause the water to flow toward a filter, 5, which would remove suspended solids. A relief valve, 3, and a pressure gauge, 4, would provide additional control over the pump. The waste water would proceed to a column having an opening to the atmosphere, 6, and the catalyst bed, 8. The water level in the column containing the catalyst is represented by 7. Angel hair, 9, serves as support for the ion exchange resin. The treated waste water is collected in the receiving drum, 10, will contain a relatively insignificant ppm of morpholine and other alkaline impurities.

Examples 1 through 10 will demonstrate the method of the invention. It is understood that the examples given are only for illustration and that the instant invention is not intended to be limited thereby.

Examples 7 through 10 demonstrate that as much as 98% of morpholine impurities can be removed by this method.

EXPERIMENT 1

Washing of Used Acidic Ion Exchange Resin from MTBE Process (Amberlyst ® 15 Resin)

To 100 g of spent acidic ion exchange resin from the methyl tertiary butyl ether process (Amberlyst ® 15 resin) was added 100 ml of deionized water. The resin and water were stirred for 16 hours. The resin was filtered and 56.6 g of filtrate obtained. It had a TOC of 1,200 mg/l and showed the presence of methanol and tert-butanol. TOC represents total organic carbon. A second 100 ml of deionized water was added to the resin and the mixture stirred for 8 hours.

The resin was filtered to get 107.9 g of filtrate. The second aqueous wash contained 500 mg/l TOC and about half the levels of methanol and tert-butanol compared to the first wash. A third 100 g of deionized water was added to the resin and the resin-water stirred for 16 hours. The resin was filtered to obtain 88.49 of filtrate. The third aqueous filtrate contained 230 mg/l TOC and about 10% the level of methanol and tert-butanol compared to the first wash.

EXPERIMENTS 2, 3, 4 AND 5

Utilization of "Spent MTBE Resin"

Used (spent) acidic ion exchange resin from the MTBE process (Amberlyst ® 15 resin) was washed three times with water as described above and the washed resin used in the following experiment to remove morpholine from water which also contained cations such as sodium, magnesium and calcium. (Water was from a main equalization tank MET).

2. 1.0 g of the washed used resin described above was stirred with 200.0 g of MET water (originally 463 ppm morpholine) for 24 hours at room temperature. The filtrate was analyzed by gas-liquid chromatography (GLC) and was found to contain only 91 ppm morpholine.

3. 3.0 g of the washed used resin was mixed with 200.0 g of MET water as described above. After treatment, the filtrate was analyzed as 29 ppm morpholine (GLC).

4. 5.0 g of the washed used resin was mixed with 200.0 g of MET water as described above. After treatment, the filtrate was analyzed for 9 ppm morpholine (GLC).

5. 10.0 g of the washed used resin was mixed with 200.0 g of MET water as described above. After treatment, the filtrate was analyzed for 3 ppm morpholine (GLC).

EXPERIMENT 6

A standard solution of morpholine in water was made by mixing 1.75 g of morpholine with 3498.25 g of deionized water to give a morpholine solution in water that contains 500 ppm morpholine.

EXPERIMENT 7

5.0 g of spent acidic ion exchange resin from the MTBE process was added to 200.0 g of the aqueous morpholine solution described in Experiment 6. The resin was stirred in the morpholine-containing water for 5 days at room temperature and filtered. The filtrate was analyzed for morpholine and was found to contain less than 1 ppm morpholine by GLC. Clearly the used resin removed essentially 100% of the 500 ppm morpholine from the aqueous standard.

EXPERIMENT 8

Similarly, 5.0 g of spent acidic ion exchange resin used in a MTBE process (Amberlyst ® 15 resin) was added to 200.0 g of MET water containing 463 ppm morpholine, 147 ppm calcium, 59 ppm magnesium and 147 ppm sodium (as ions). After stirring for 120 hours at room temperature the resin was filtered and the filtrate analyzed for morpholine. Of the 463 ppm originally present, only 11 ppm morpholine remained after treatment. The resin removed approximately 98% of the morpholine originally present in the main equalization tank water.

EXPERIMENT 9

A 3" by 4' glass column was set up in a pilot plant experiment to prove the feasibility of removing morpholine, calcium, magnesium and sodium from the MET water. A diagram of the apparatus is shown in FIG. 1. Using ion exchange resins Amberlyst ® 15 and Amberlite ® 120 the alkaline materials were removed until the resins were exhausted. After exhaustion of the resins morpholine was replaced from the resin by calcium. This suggests that if the resins are not to be regenerated by treatment with mineral acids, amines can be recovered by treatment of the resins with lime.

EXPERIMENT 10

In one 100 ml burette was placed 200 ml of wet "MTBE Used Resin." In a second 100 ml burette was placed 20 ml of fresh wet Amberlite ® 120 resin. Five gallons of an aqueous morpholine solution were prepared containing 764 ppm morpholine. Nitrogen analysis calculated 123 ppm and observed 122 ppm. Additional funnels containing this solution were anchored at the top of the burettes. The solution was added at the same rate through the two resins. The effluent solutions were analyzed at a regular rate for nitrogen.

The nitrogen analysis was done by Antek Chemiluminescence. After 4,495 ml of the solution was passed through the Amberlite ® 120 resin over a 98 hour period the effluent contained 1 ppm nitrogen. This is equivalent to about 6 parts per million morpholine. After an additional 60 ml was added the exit solution contained 25 parts per million nitrogen. With the used catalyst, after 3,127 ml of solution the solution exiting had 1 ppm nitrogen. After 3,217 ml the effluent contained 30 ppm nitrogen. Thus, ion exchange resins are a very effective way of removing morpholine from solutions and the "used MTBE resin" to be discarded is about 70% as effective as fresh resin.

We claim:

1. A method for removing alkaline impurities from waste water which comprises
    using a partially spent insoluble cross-linked polymeric ion exchange resin catalyst which has been previously used in the production of MTBE, ETME and TAME, possessing 60–85% of its original activity, washing the used resin catalyst, contacting the waste water with the used resin catalyst for a period of 0.01 hours to 10 hours and removing the filtrate.

2. The method of claim 1 wherein the used resin catalyst has about 70–85% of its original activity.

3. The method of claim 1 wherein the alkaline impurities are cations from the group consisting of sodium, magnesium and calcium.

4. The method of claim 1 wherein the alkaline impurities are amines.

5. The method of claim 4 wherein the amine impurity is morpholine.

6. The method of claim 1 wherein the used resin catalyst is subsequently treated with lime.

7. The method of claim 6 wherein lime treatment of the used resin catalyst replaces morpholine with calcium.

8. A method for removing alkaline impurities from waste water which comprises:
    collecting the waste water in a main equalization tank, pumping the waste water through a filter to remove visible particles, feeding the waster water into a column containing a partially spent insoluble cross-linked polymeric ion exchange resin catalyst which has been previously used in production of MTBE, ETME and TAME, possessing 60–85% of its original activity, wherein the column has an opening to the atmosphere, washing the used resin catalyst, contacting the waste water with the used resin catalyst for a period of 0.01 hours to 10 hours and removing the filtrate.

9. The method of claim 8 wherein the used resin catalyst has about 70–85% of its original activity.

10. The method of claim 8 wherein the alkaline impurities are cations from the group consisting of sodium, magnesium and calcium.

11. The method of claim 8 wherein the alkaline impurities are amines.

12. The method of claim 11 wherein the amine impurity is morpholine.

* * * * *

UNITED STATES PATENT AND TRADEMARK OFFICE
CERTIFICATE OF CORRECTION

PATENT NO. : 5,264,132
DATED : November 23, 1993
INVENTOR(S) : George Phillp Speranza
Edward Thomas Marquis It is certified that error appears in the above-indentified patent and that said Letters Patent is hereby corrected as shown below:

Column 6, line 21, claim 8, delete "waster" and insert therefor --waste--.

Signed and Sealed this

Nineteenth Day of April, 1994

Attest:

BRUCE LEHMAN

Attesting Officer        Commissioner of Patents and Trademarks